(12) United States Patent
Hickenbottom et al.

(10) Patent No.: US 9,027,189 B2
(45) Date of Patent: May 12, 2015

(54) BRUSH HEIGHT SETTING ASSEMBLY AND METHOD

(71) Applicants: Ronald Hickenbottom, Sullivan, IL (US); Michael R. Newman, Sullivan, IL (US)

(72) Inventors: Ronald Hickenbottom, Sullivan, IL (US); Michael R. Newman, Sullivan, IL (US)

(73) Assignee: Agri-Fab, Inc., Sullivan, IL (US)

( * ) Notice: Subject to any disclaimer, the term of this patent is extended or adjusted under 35 U.S.C. 154(b) by 401 days.

(21) Appl. No.: 13/720,599

(22) Filed: Dec. 19, 2012

(65) Prior Publication Data

US 2014/0165308 A1 Jun. 19, 2014

(51) Int. Cl.
*E01H 1/04* (2006.01)
*A01G 1/12* (2006.01)

(52) U.S. Cl.
CPC ........... *A01G 1/125* (2013.01); *Y10T 29/49826* (2015.01)

(58) Field of Classification Search
CPC ..... A01D 34/54; A01D 42/06; A01D 89/004; A01D 34/74; A01D 2101/00; A01G 1/125; A01G 1/12
USPC ........ 15/79.1, 79.2, 82, 83, 21.1, 52.1, 78, 49
See application file for complete search history.

(56) References Cited

U.S. PATENT DOCUMENTS

| | | | |
|---|---|---|---|
| 1,722,063 A | 7/1929 | Spitzenberg | |
| 2,409,921 A | 10/1946 | Wulff | |
| 2,622,335 A | 12/1952 | Smith | |
| 3,591,883 A * | 7/1971 | Armstrong et al. | 15/149 |
| 3,973,327 A * | 8/1976 | Cardinale | 33/494 |
| D260,974 S | 9/1981 | Lesser | |
| 4,650,005 A | 3/1987 | Tebben | |
| 5,259,175 A * | 11/1993 | Schmidt | 56/17.2 |
| 5,420,678 A | 5/1995 | Rasch et al. | |
| 5,886,840 A * | 3/1999 | Atkinson et al. | 359/871 |
| 6,247,243 B1 | 6/2001 | Check | |
| 6,470,588 B1 | 10/2002 | Pilger | |
| 6,802,098 B2 | 10/2004 | Geyer et al. | |
| 7,488,391 B2 | 2/2009 | Hansen | |
| 2003/0074753 A1* | 4/2003 | Hansen | 15/52.1 |
| 2009/0235472 A1* | 9/2009 | Johnson et al. | 15/83 |

OTHER PUBLICATIONS

Agri-Fab Onwer's Manual for Model No. 45-04561 44" Lawnsweeper from (Apr. 19, 2011).*

* cited by examiner

*Primary Examiner* — Joseph J Hail
*Assistant Examiner* — J. Stephen Taylor
(74) *Attorney, Agent, or Firm* — Vedder Price P.C.

(57) ABSTRACT

A lawn sweeper including a housing may have a plurality of first markings, a brush height adjustment assembly including an arm moveable between a setting orientation and a sweeping orientation and a gauge connected to the arm including a plurality of second markings that corresponds with the first markings such that when the arm is disposed in the setting orientation a grass height associated with one of the second markings determines an adjustment of the brush height assembly to the sweeping orientation to one of the first markings that corresponds with the one of the second markings.

11 Claims, 3 Drawing Sheets

BRUSH HEIGHT SETTING ASSEMBLY AND METHOD

FIELD OF DISCLOSURE

The present disclosure generally relates to a lawn sweeper assembly, and more particularly, to an assembly and method for setting a proper brush height of a lawn sweeper.

BACKGROUND

Lawn sweeping is a conventional technique used by many homeowners, gardeners, and groundskeepers to collect unwanted debris from a lawn. Such unwanted debris may include, for example, grass clippings, leaves (mulched or whole), and/or pine needles. A well groomed lawn gives a good first impression, whether the well groomed lawn is associated with a business or a home. Furthermore, a well groomed lawn is part of living the "American dream." For these reasons, among others, a need exists, for an improved lawn sweeper for collecting debris from a lawn.

Lawn sweepers are used in various ways for maintaining a well-groomed lawn. For example, groundskeepers will often mow a lawn, thereby creating grass clippings, during spring and summer there may be debris from trees, trash and other sources and during autumn trees shed leaves or they are blown about. However, the early lawn sweepers used a brush fixed to a housing. As a result, multiple passes were needed in order to achieve the intended results and often such results could not be achieved, which resulted in wasted effort, disappointment and groundskeepers seeking alternate methods.

Early improvements to lawn sweepers generally included some form of a brush height adjustment assembly. Most commonly, the brush height adjustment assembly will include either adjustment of the housing height when the brush is disposed at a fixed location on the housing or adjustment of the brush height when the brush is movable with respect to the housing. However, then the difficulty for a groundskeeper was to determine the correct brush height setting to efficiently complete the task without multiple passes over the same territory. This determination could only be made by trial and error which again results in lost time, wasted effort and frustration.

The disadvantages of current lawn sweeper assemblies outlined above, among other things, are overcome by a brush height setting assembly that may be easily used in connection with a lawn sweeper assembly and enable a groundskeeper to set the brush at the correct height for efficient and proper use of a lawn sweeper.

Therefore, there is a need in the art for a lawn sweeper assembly that overcomes the disadvantages of the prior art and provides the advantages as described in this disclosure.

BRIEF DESCRIPTION OF DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

Figure 1:
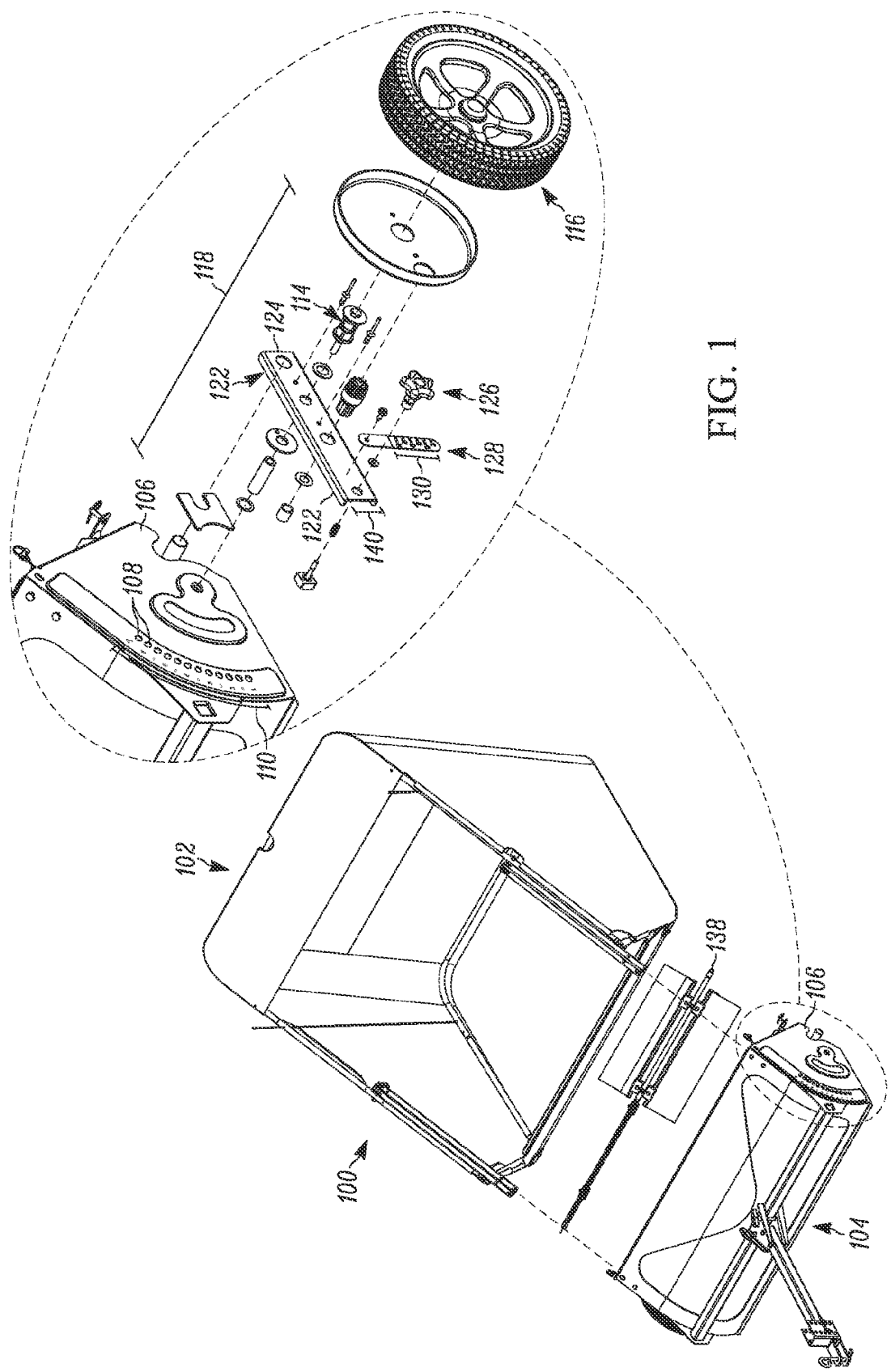
FIG. 1 illustrates a partially exploded view of a lawn sweeper assembly in accordance with one embodiment of the present disclosure.

The present disclosure is not limited to the particular details of the apparatus depicted, and other modifications and applications may be contemplated. Further changes may be made in the apparatus, device or methods without departing from the true spirit of the scope of the disclosure herein involved. It is intended, therefore, that the subject matter in this disclosure should be interpreted as illustrative, not in a limiting sense.

In one aspect of the present disclosure, a lawn sweeper may include a housing having a plurality of first markings, a brush height adjustment assembly including an arm moveable between a setting orientation and a sweeping orientation and a gauge connected to the arm including a plurality of second markings that corresponds with the first markings such that when the arm is disposed in the setting orientation a grass height associated with one of the second markings determines an adjustment of the brush height assembly to the sweeping orientation to one of the first markings that corresponds with the one of the second markings.

In another aspect of the present disclosure, a lawn sweeper may include a housing having an end panel with a plurality of defined locations and a first indicia set disposed adjacent the defined locations, the first indicia set including a plurality of first markings such that each marking is associated with one of the defined locations. A brush height adjustment assembly may be rotatably connected to the housing that includes an arm that is moveable between a setting orientation and a sweeping orientation. Preferably, a connection device selectively engages one of the defined locations to secure the arm. A gauge may be rotatably connected to the arm and include a second indicia set including a plurality of second markings that corresponds with the first markings such that when the arm is disposed in the setting orientation a grass height that associates with one of the second markings determines an adjustment of the brush height assembly to the sweeping orientation to one of the first markings that corresponds with the one of the second markings.

In yet another embodiment of the present disclosure, the gauge may be disposed outside an outer circumference of a ground engaging wheel assembly, the first indicia set may be defined in the housing, the gauge may depend from the arm in a downwardly vertical configuration when disposed in the setting orientation, the arm may include a brush shaft rotatably connected to the arm between a first end of the arm and a wheel axle, the gauge may be connected to the arm between the connection device and the brush shaft, the gauge may be movable between an operative orientation defined as an acute angle between the gauge and the arm and a storage orientation defined as the gauge disposed within a width of the arm, or the gauge may be movable between an operative orientation defined as an acute angle between the gauge and the arm and a storage orientation defined as the gauge disposed collinear with a longitudinal axis of the arm.

In still another embodiment of the present disclosure, a method for setting a brush height on a lawn sweeper may include moving an arm of a brush height adjustment assembly connected to a housing to a setting orientation to determine a grass height with respect to one of a plurality of gauge markings disposed on a gauge rotatably connected to the arm and disposed in an operative orientation defined as an acute angle between the gauge and the arm; moving the arm to a sweeping orientation defined by one of a plurality of housing marking that corresponds with the one of the plurality of gauge markings; and engaging a connection device disposed on an end of the arm to the one of a plurality of defined locations formed in the housing that is associated with the one of the plurality of housing markings.

In still yet another embodiment of the present disclosure, the method may further comprise moving the gauge to a storage orientation defined as the gauge disposed within a width of the arm, or moving the gauge to a storage orientation defined as the gauge disposed collinear with a longitudinal axis of the arm.

FIG. 1 illustrates a partially exploded view of a lawn sweeper assembly 100 in accordance with one embodiment of the present disclosure. The lawn sweeper assembly 100 may include a hopper 102 that is removably connected to a housing 104. The details of the lawn sweeper assembly 100 will not be described in detail except as applicable to the present disclosure because such assemblies are known in the art. For example, the assignee of the this application is also the common owner of U.S. application Ser. No. 12/053,965, filed Mar. 24, 2008; Ser. No. 12/477,559, filed Jun. 3, 2009; Ser. No. 13/450,965, filed Apr. 19, 2012; and Ser. No. 13/297,001, filed Nov. 15, 2011, each of which are hereby wholly incorporated herein by reference as if fully set forth herein.

Figure 2:
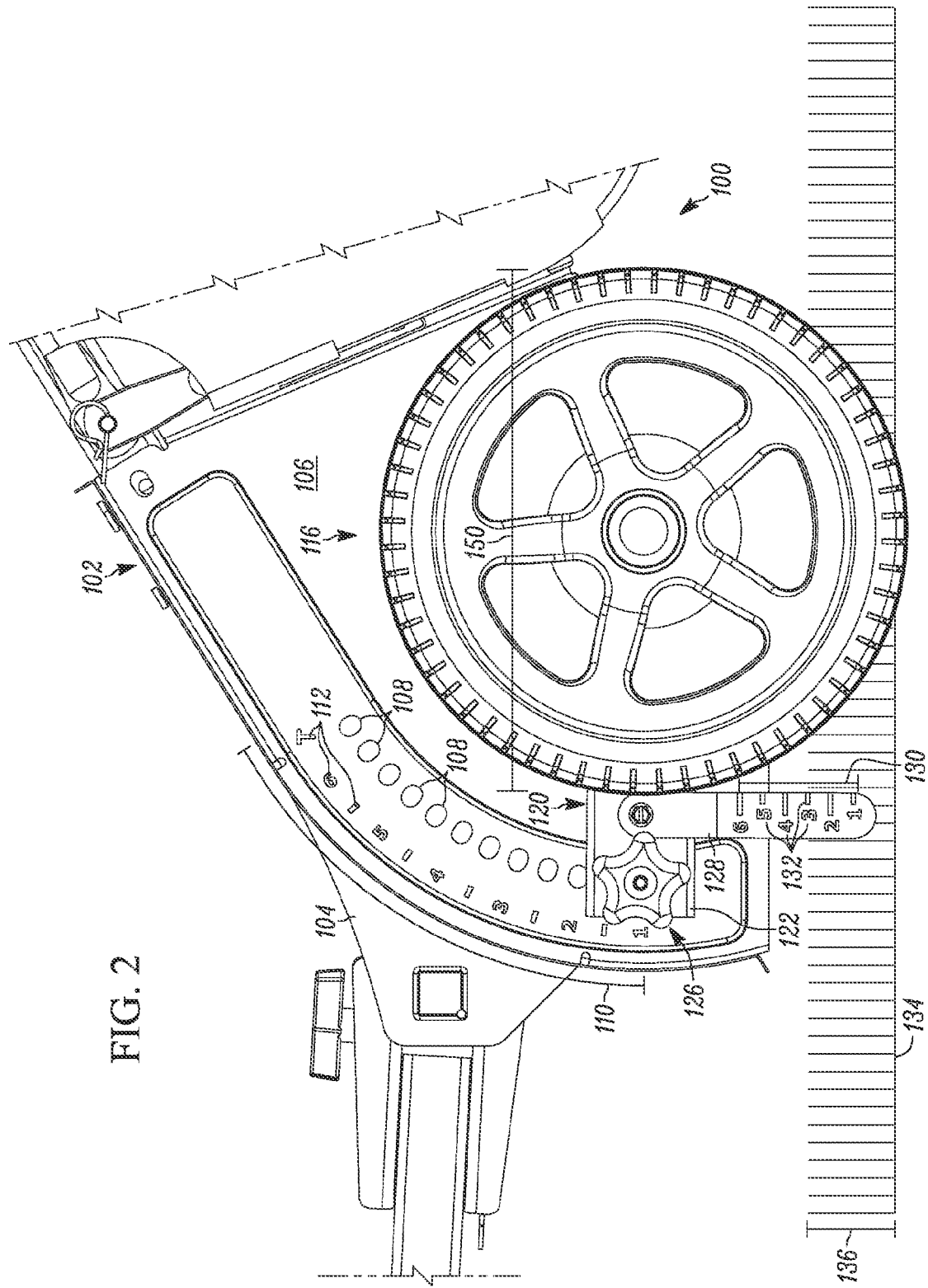
FIG. 2 illustrates a detailed side elevation view of the lawn sweeper assembly of FIG. 1 including an arm disposed in a setting orientation and/or a sweeping orientation.
Figure 3:
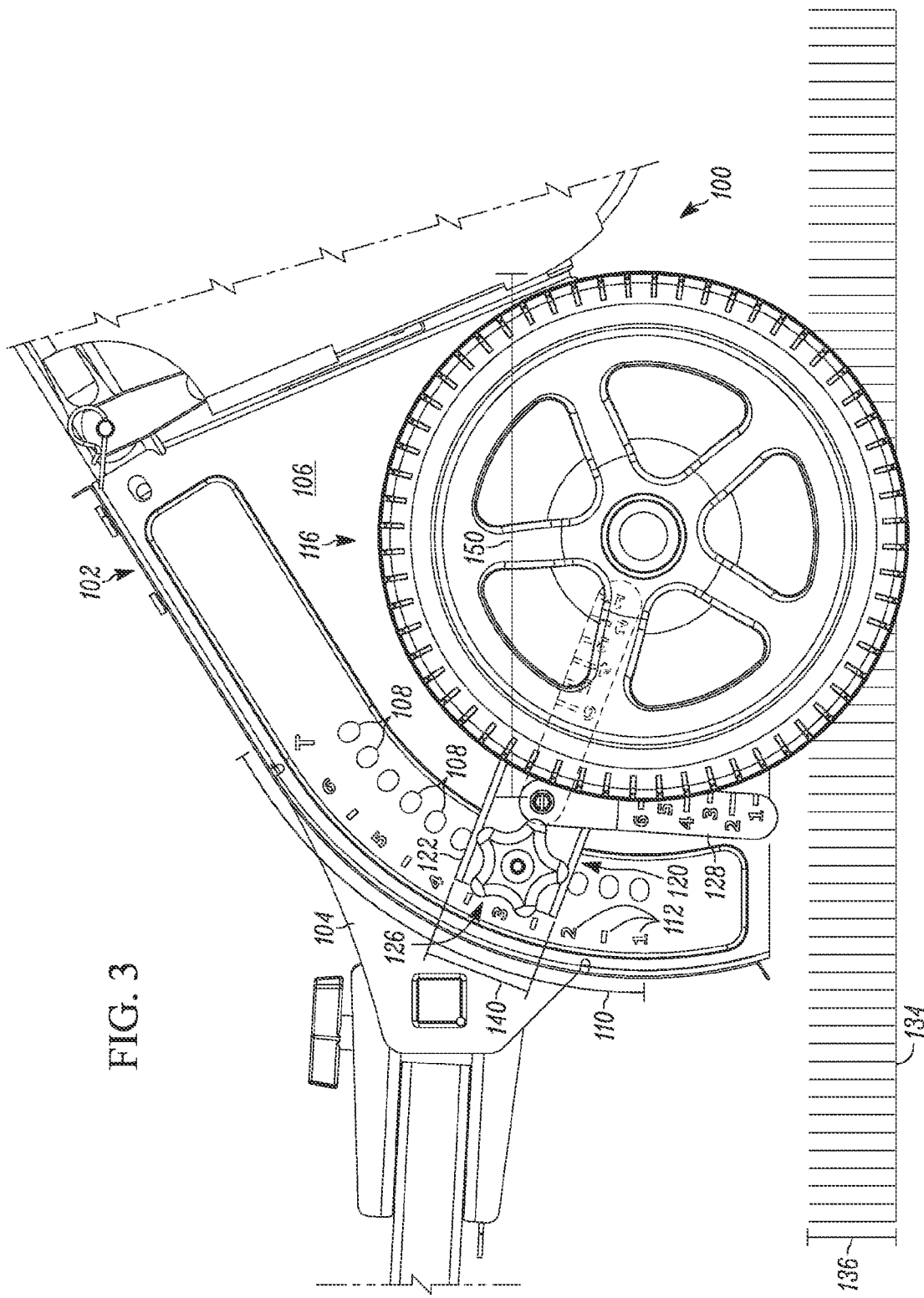
FIG. 3 illustrates a detailed side elevation view of the lawn sweeper assembly of FIG. 2 including the arm adjusted to be disposed in one embodiment of a sweeping orientation.

FIG. 2 illustrates a detailed side elevation view of the lawn sweeper assembly 100 of FIG. 1 including an arm disposed in a setting orientation and/or a sweeping orientation and FIG. 3 illustrates a detailed side elevation view of the lawn sweeper assembly 100 of FIG. 2 including the arm adjusted to be disposed in on embodiment of a sweeping orientation. In one embodiment, the housing 104 may include an end panel 106 having a plurality of defined locations 108 and a first indicia set 110 disposed adjacent the defined locations 108. It will be understood by one of skill in the art that the defined locations 108 may include separate discrete apertures, apertures joined by an interconnecting slot having a width less than a diameter of the apertures, a slot having any suitable configuration such as arcuate, or the like, etc. as desired to implement the intended functionality, which is infinite to discrete connection and secure fixing of a connection device 126, as further described below, in order to facilitate adjustability of a brush height adjustment assembly 118, as further described below. The first indicia set 110 may include a plurality of first markings 112 such that each first marking 112 is associated with one of the defined locations 108. It will be recognized that the first markings 112 may include any character, insignia, mark, or the like, etc. as desired to implement the intended functionality of enabling a groundskeeper to set a brush of the lawn sweeper assembly 100 that is connected to the brush height adjustment assembly 118 at the correct height for efficient and proper use of the lawn sweeper assembly 100 in accordance with the teachings of the present disclosure. In one embodiment, the first markings 112 may be an alternating combination of Arabic numeral characters, i.e., 1, 2, 3, etc., and a character, i.e., 'dash' or 'hyphen,' applied to the housing 104, such as by paint, decal, stamp, sticker, or the like, etc., as appropriate so as to be associated with the defined locations 108 as desired. In another embodiment, the first markings 112 described above may be defined in the housing, such as by etching, stamping, laser cutting, or the like, etc.

As further illustrated in FIG. 1, a wheel axle 114 may be connected to the end panel 106 and a ground engaging wheel 116 may be rotatably connected to the wheel axle 114 to support the lawn sweeper assembly off of the ground 134. A brush height adjustment assembly 118 may be rotatably connected to the wheel axle 114 and may include an arm 120 having a first end 122 and a second end 124. In one embodiment, the arm 120 may include a brush shaft 138 rotatably connected to the arm 120 between the first end 122 and the wheel axle 114. The arm 120 may be moveable between a setting orientation, as shown in FIG. 2, and a sweeping orientation, as shown in FIG. 2 or 3 or any of the other defined locations 108 or other suitable disposition as may be available in an infinite, slot or connected aperture configuration that defines the defined location 108. The setting orientation may be defined by the arm 120 of the brush height adjustment assembly 118 disposed in a desired disposition in order to implement the intended functionality of enabling a groundskeeper to set a brush of the lawn sweeper assembly 100 that is connected to the brush height adjustment assembly 118 at the correct height for efficient and proper use of the lawn sweeper in accordance with the teachings of the present disclosure. For example, in one embodiment the setting orientation may be the arm 120 in its lowermost location where the connection device 126 engages the lowermost defined location 108, i.e., the defined location closest or most near to the ground 134. The sweeping orientation may be defined as the arm 120 of the brush height adjustment assembly 118 disposed in a desired disposition in order to implement the intended functionality of enabling a groundskeeper to set a brush of the lawn sweeper assembly 100 that is connected to the brush height adjustment assembly 118 at the correct height for efficient and proper use of the lawn sweeper in accordance with the teachings of the present disclosure. For example, in one embodiment the sweeping orientation may be the arm 120 in any of the defined locations 108 or any other location.

The first end 122 may include a connection device 126 to selectively engage one of the defined locations 108. It is within the teachings of the present disclosure that the connection device 126 may be any suitable device or assembly that facilitates connection or coupling of the arm 120 to the end panel 106 by engaging any of the defined locations 108. For example, in one embodiment, the connection device 126 may be a threaded fastener that engages complementary threaded apertures at the defined locations 108, a quick-release fastener, a ball lock pin, etc. or the like or any other suitable selectively releaseably secure connector satisfactory to provide the intended functionality.

The arm 120 may include a rotatably connected gauge 128. In one embodiment, the gauge 128 may be disposed between the connection device 126 and the wheel axle 114. The gauge 128 may also include a second indicia set 130 including a plurality of second markings 132. It will be recognized that the second markings 132 may include any character, insignia, mark, or the like, etc. as desired to implement the intended functionality of enabling a groundskeeper to set a brush of the lawn sweeper assembly 100 that is connected to the brush height adjustment assembly 118 at the correct height for efficient and proper use of the lawn sweeper assembly 100 in accordance with the teachings of the present disclosure. In one embodiment, the second markings 132 may be an alternating combination of alternating Arabic numeral characters, i.e., 1, 2, 3, etc., and a character, i.e., 'dash' or 'hyphen,' applied to the housing 104, such as by paint, decal, stamp, sticker, or the like, etc., as appropriate. In another embodiment, the second markings 132 described above may be defined in the gauge 128, such as by etching, stamping, laser cutting, or the like, etc. Preferably, the second markings 132 correspond with the first markings 112 such that when the arm 120 is disposed in the setting orientation a grass height 136 that associates with one of the second markings 132 determines an adjustment of the brush height assembly 118 to the sweeping orientation to one of the first markings 112 that corresponds with the one of the second markings 132. For example, as shown in FIG. 2, when the arm 120 is disposed in the setting orientation the grass height 136 is associated with the second marking 132 identified as '3.' The arm 120 may then be adjusted so that the connection device 126 engages the defined location 108 associated with the first marking 112 identified as '3.' Preferably, in one embodiment the gauge 128 may be connected to the arm 120 so as to be disposed outside an outer circumference 150 of the ground engaging wheel 116 in order to increase the ease of use in accordance with the present disclosure. The gauge 128 depends from the arm 120 in a downwardly vertical configuration when disposed in the setting orientation. In one embodiment, the gauge 128 may be connected to the arm 120 between the connection device 126 and the brush shaft 138. In order to provide additional functionality and longevity of use, the gauge 128 may be movable between an operative orientation defined as an acute angle between the gauge 128 and the arm 120 (e.g., as shown in FIGS. 2 and 3 and any position associated with the setting position and any defined location) and a storage orientation defined as the gauge 128 disposed within a width 140 of the arm 120 (as shown in one embodiment in dashed lines in FIG. 3 where the gauge 128 is disposed collinear with a longitudinal axis of the arm 120).

In operation and referring to FIGS. 2 and 3, a method for setting a brush height on a lawn sweeper assembly 100, may include, in one embodiment, moving the arm 120 of a brush height adjustment assembly 118 to a setting orientation (FIG. 2) to determine the grass height 136 with respect to one of a plurality of gauge markings 132 of the gauge indicia set 130 disposed on the gauge 128. Preferably, the brush adjustment assembly 118 is rotatably connected to the wheel axle 114 that is connected to the end panel 106 of the housing 104 and a ground engaging wheel 116 is rotatably connected to the wheel axle 114. The gauge 128 may be rotatably connected to the arm 120 and disposed in an operative orientation defined as an acute angle between the gauge 128 and the arm 120. The arm 120 may be adjusted (by moving, i.e., selectively releasing or disengaging the connection device 126) to a sweeping orientation defined by one of a plurality of housing marking of a housing indicia set that corresponds with the one of the plurality of gauge markings (see FIG. 3, by way of example only, merely to illustrate in correspondence with FIG. 2). The connection device 126 disposed on an end of the arm 120 may engage or otherwise connect or couple to the one of a plurality of defined locations 108 formed in the housing 104 that is associated with the one of the plurality of housing markings 112. The brush connected to the brush shaft 138 is now disposed in an orientation that is beneficial to implement the intended functionality of enabling a groundskeeper to set a brush of the lawn sweeper assembly 100 that is connected to the brush height adjustment assembly 118 at the correct height for efficient and proper use of the lawn sweeper in accordance with the teachings of the present disclosure. In order to provide additional functionality and longevity of use, the gauge 128 may be moved to a storage orientation defined as the gauge 128 disposed within a width 140 of the arm 120 (as shown in one embodiment in dashed lines in FIG. 3 where the gauge 128 is disposed collinear with a longitudinal axis of the arm 120).

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. A lawn sweeper comprising:
a housing including an end panel having a plurality of defined locations and a first indicia set disposed adjacent the defined locations, the first indicia set including a plurality of first markings such that each marking is associated with one of the defined locations, a wheel axle connected to the end panel and a ground engaging wheel rotatably connected to the wheel axle, a brush height adjustment assembly rotatably connected to the wheel axle including an arm having a first end and a second end, the arm moveable between a setting orientation and a sweeping orientation, the first end including a connection device to selectively engage one of the defined locations, and a gauge rotatably connected to the arm between the connection device and the wheel axle, the gauge including a second indicia set including a plurality of second markings that corresponds with the first markings such that when the arm is disposed in the setting orientation a grass height that associates with one of the second markings determines an adjustment of the brush height assembly to the sweeping orientation to one of the first markings that corresponds with the one of the second markings.

2. The lawn sweeper as recited in claim 1, wherein the gauge is disposed outside an outer circumference of the ground engaging wheel assembly.

3. The lawn sweeper as recited in claim 1, wherein the first indicia set is defined in the housing.

4. The lawn sweeper as recited in claim 1, wherein the gauge depends from the arm in a downwardly vertical configuration when disposed in the setting orientation.

5. The lawn sweeper as recited in claim 1, wherein the arm includes a brush shaft rotatably connected to the arm between the first end and the wheel axle.

6. The lawn sweeper as recited in claim 5, wherein the gauge is connected to the arm between the connection device and the brush shaft.

7. The lawn sweeper as recited in claim 1, wherein the gauge is movable between an operative orientation defined as an acute angle between the gauge and the arm and a storage orientation defined as the gauge disposed within a width of the arm.

8. The lawn sweeper as recited in claim 1, wherein the gauge is movable between an operative orientation defined as an acute angle between the gauge and the arm and a storage orientation defined as the gauge disposed collinear with a longitudinal axis of the arm.

9. A method for setting a brush height on a lawn sweeper including a brush height adjustment assembly rotatably connected to a wheel axle connected to an end panel of a housing having a ground engaging wheel rotatably connected to the wheel axle, the method comprising:
providing a gauge rotatably connected to an arm of the brush height adjustment assembly between a connection device disposed at a first end of the arm and the wheel axle;
moving the arm to a setting orientation;
rotating the gauge to an operative orientation;

determining a grass height with respect to one of a plurality of gauge markings of a gauge indicia set disposed on the gauge;

moving the arm to a sweeping orientation defined by one of a plurality of housing marking of a housing indicia set that corresponds with the one of the plurality of gauge markings; and engaging the connection device to the one of a plurality of defined locations formed in the housing that is associated with the one of the plurality of housing markings.

10. The lawn sweeper as recited in claim 9, further comprising moving the gauge to a storage orientation defined as the gauge disposed within a width of the arm.

11. The lawn sweeper as recited in claim 9, further comprising moving the gauge to a storage orientation defined as the gauge disposed collinear with a longitudinal axis of the arm.

* * * * *